United States Patent [19]

Pownall

[11] 3,908,082

[45] Sept. 23, 1975

[54] DIM OBJECT ENHANCEMENT TECHNIQUE IN VIDEO SIGNAL PRODUCING SYSTEM

[75] Inventor: Leslie A. Pownall, Littleton, Colo.

[73] Assignee: Martin Marietta Corporation, Denver, Colo.

[22] Filed: Nov. 13, 1972

[21] Appl. No.: 305,775

[52] U.S. Cl. ... 178/7.2; 178/DIG. 33; 178/DIG. 34; 250/203 CT

[51] Int. Cl. ............................................ H04n 5/38

[58] Field of Search .............. 178/6.8, 7.2, DIG. 33, 178/DIG. 34; 250/203 CTS

[56] References Cited

UNITED STATES PATENTS 3,010,024 11/1961 Barnett et al................ 250/203 CT

*Primary Examiner*—Albert J. Mayer

*Attorney, Agent, or Firm*—Sughrue, Rothwell, Mion, Zinn & Macpeak

[57] ABSTRACT

A system for enhancing those portions of a video signal corresponding to relatively dim objects in an image field comprised of both dim and bright objects. Enhancement is realized by integrating the light received from the dim objects over several frames of the television pickup camera while neutralizing the light received from bright objects during each frame. After a predetermined number of frames, a video signal corresponding to the image field is gated out.

5 Claims, 1 Drawing Figure

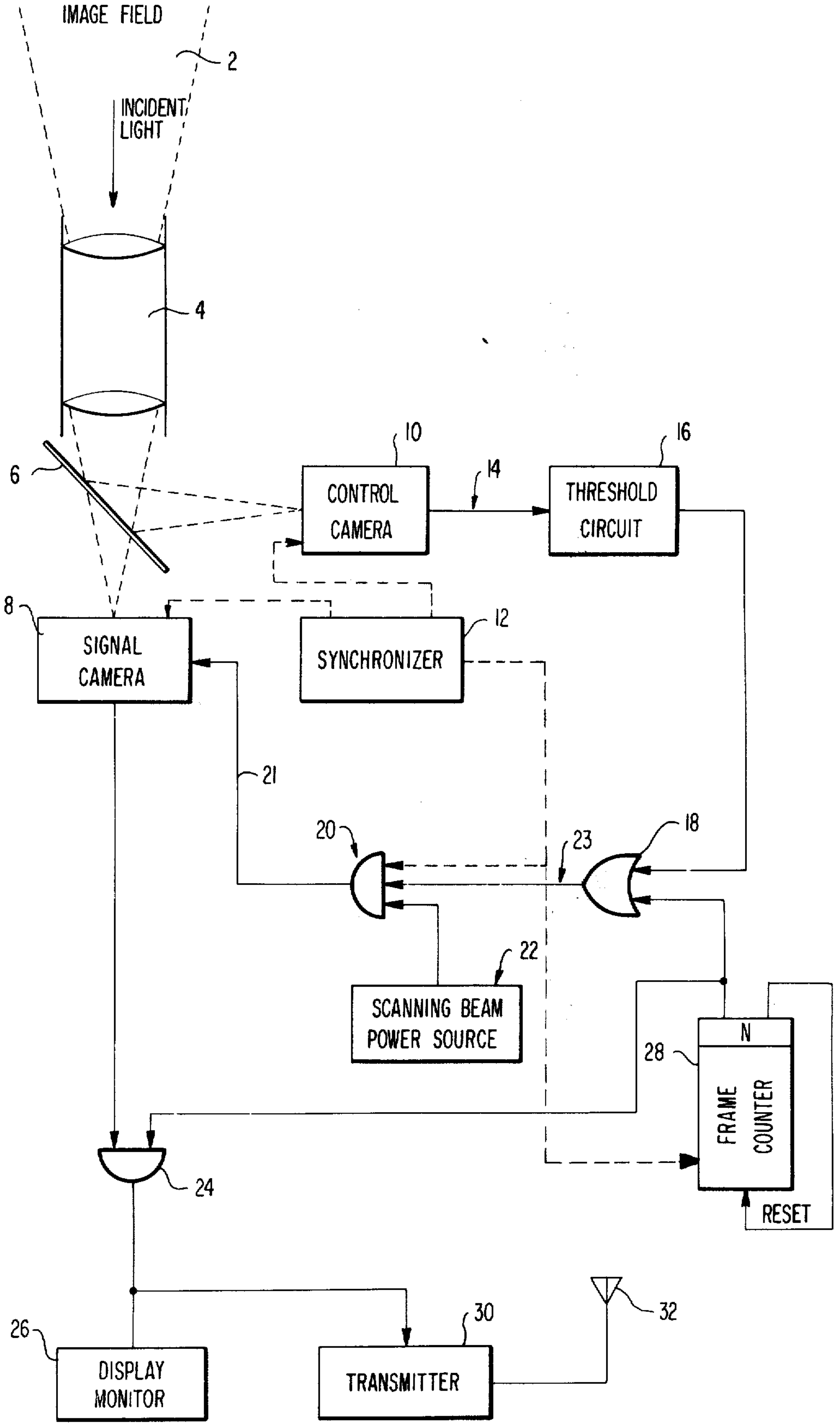
IMAGE FIELD
2
INCIDENT LIGHT
4
6
10
CONTROL CAMERA
14
16
THRESHOLD CIRCUIT
8
SIGNAL CAMERA
SYNCHRONIZER
12
21
20
23
18
22
SCANNING BEAM POWER SOURCE
28
N
FRAME COUNTER
RESET
24
26
DISPLAY MONITOR
TRANSMITTER
30
32

DIM OBJECT ENHANCEMENT TECHNIQUE IN VIDEO SIGNAL PRODUCING SYSTEM

BACKGROUND OF INVENTION

In video signal producing systems, a television pickup camera, such as a vidicon, orthicon, or image orthicon, is used to convert an optical image in the camera field of view into a sequence of electrical signals. As is well known, the optical image is focused on the camera signal plate using a suitable lens system. In a vidicon, the operation of which is based on the phenomenon of photoconductivity, the signal plate includes a photoconductive surface whose resistance varies inversely with the intensity of scene brightness. Thus, the optical image induces a pattern of varying conductivity corresponding to the image brightness. Positive changes are acquired at each point on the signal plate in proportion to the conductivity of the photoconductor at the point to form an electrical image corresponding to the optical image. As a scanning electron beam scans the signal plate, the previously acquired positive charge at each point of the electrical image is neutralized or erased, producing an electrical signal having an amplitude varying in proportion to the intensity of light received from the scene. A full scan of the image corresponds to one frame. Each frame includes a plurality of horizontal signal scans and an equal number of retrace scans during which time the scanning beam is blanked under the control of the camera blanking or Z-axis control.

A problem with the above described conventional video signal producing system occurs when the optical image is comprised of both dim and bright objects. Such an image field gives rise to a problem known as "blooming." When the video signal is converted back to an optical image using a television picture tube, the bright objects bloom, obscuring the dim objects in the vicinity of the bright objects.

The blooming problem is especially troublesome in the field of star tracking using large space telescopes. These telescopes focus the star field onto a television pickup tube which produces a corresponding video signal. The video signal is applied to a display monitor where it is reconverted to the optical image within the telescope field of view. Star fields include both stars and planetary bodies. Star intensity levels are orders of magnitude lower than the reflected illumination from planetary bodies in the same image field. Further, both bright and dim stars may exist in the same image field. Thus, planetary bodies and bright stars bloom obscuring the dim stars.

SUMMARY OF INVENTION

It is an object of the present invention to alleviate the above described problem; namely, the obscuring of dim objects in a television camera field of view including both bright and dim objects.

It is a further object to improve present star tracking systems using large space telescopes to focus a star field onto a television camera by preventing the obscuring of dim stars by bright stars, or the obscuring of stars by planetary bodies.

These and other objects are accomplished in accordance with the teachings of the invention by selectively blanking the scanning beam in the areas of the electrical image corresponding to low levels of received brightness; that is, dim objects. This permits longer integration of the dim areas of the image since the buildup of positive charges is proportional not only to the absolute intensity of received light, but also the time over which the light impinges on an area before being neutralized by the scanning beam.

Selective blanking of a signal scan is effected through the use of a control video signal produced by a second television pickup camera focused on the same image field as the first camera. The television camera producing the control video signal is termed herein the control camera while the camera whose scanning beam is selectively blanked is termed the signal camera.

DESCRIPTION OF DRAWING

The FIGURE represents one embodiment of the dim object enhancement system of the present invention.

DETAILED DESCRIPTION OF INVENTION

The invention pertains to a system for enhancing relatively dim objects in the presence of bright objects appearing simultaneously within the field of view of the television pickup camera.

Referring to the FIGURE, signal camera 8 is a conventional television pickup camera, such as a vidicon, although the invention is not limited to the use of the vidicon. It will be obvious to those having ordinary skill in the art that the invention is equally applicable to video signal producing systems using other types of television cameras, such as the orthicon or image orthicon. As is known, camera 8 includes what is generally termed an Z-axis control or blanking control circuit for producing the required horizontal and vertical blanking intervals. For ease in understanding the present invention, the blanking control circuit of the signal camera 8 is represented in the FIGURE in block form external to the camera 8. More specifically, the blanking control for the signal camera 8 is illustrated as comprising a scanning beam power source 22 and the coincidence gate 20 represent conventional circuitry within the signal camera 8. During the horizontal and vertical blanking intervals, synchronizer 12 produces a disabling signal to block power from the scanning beam producing electron gun.

In accordance with the teachings of the present invention, the blanking control circuit is modified to the effect that the power to the electron gun can be selectively removed during times other than the horizontal and vertical blanking intervals. This is shown schematically in the FIGURE by the third input 23 to the coincidence gate 20. Gate 20 can thus be disabled to de-energize the scanning beam by a threshold signal from the output of an analog threshold circuit 16 responsive to the control video signal from the control camera 10. The operation of the gate 20 can also be controlled from the output of frame counter 28, as will be explained more fully below. Although the means for selectively de-energizing the scanning beam is illustrated as a three input coincidence gate, other suitable switching means responsive to a threshold signal from the threshold detector 16 for blocking scanning beam power from the electron gun can be used. Operation of the signal camera 8 and the control camera 10 is synchronized through the use of a common synchronizer 12.

Operation of the enhancement system of the present invention will now be described. An image field 2 is focused onto the signal camera 8 through lens system 4.

Lens system 4 can be any conventional lens system. When viewing a star field, the lens system 4 may take the form of a large space telescope. Through the use of beam splitter 6, the image field focused on signal camera 8 is also focused on control camera 10. Slightly defocussing the control camera image improves overall system repeatability and performance by assuring that the selective blanking action completely surrounds the bright star or planet disc. The scanning beams of both the signal camera and the control camera begin their scans simultaneously through the operation of common synchronizer 12. The control video signal produced by the control camera 10 appears on line 14, which is coupled to the input of a threshold circuit 16. Threshold circuit 16 is a conventional analog threshold circuit which produces a threshold signal when the input signal thereto is above a predetermined amplitude. The threshold of circuit 16 is set at a level corresponding to a level just below that which corresponds to the amplitude of the video signal representing bright objects in the image field. As a result, the output of threshold circuit 16 is at what will be termed a logic low except at the time when the received video signal represents a bright object, at which time the threshold circuit 16 produces a logic high threshold signal. The output of the circuit 16 is coupled to OR gate 18, the output of which is coupled to the coincidence gate 20. A second input to OR gate 18 is coupled to the Nth stage of the frame counter 28. The output from the frame counter 28 is also at a logic low except for the time when the counter counts the Nth frame. Coincidence gate 20 is disabled whenever the output line 23 of OR gate 18 carries a signal representing a logic low. With gate 20 disabled, power from the scanning beam power source 22 is cut off from the electron gun of the signal camera 8 whereby the scanning beam is blanked.

It now becomes evident that during successive frames, the scanning beam of camera 8 is unblanked; that is, energized, only when the output of the threshold circuit 16 goes to a logic high or a count of N is registered in counter 28. As a result, during each successive frame prior to the Nth frame, bright portions of the electrical image are scanned and erased while the portions of the electrical image corresponding to dim objects are enhanced through integration of the light intensity in that the scanning beam is blanked as it passes over these latter portions. During the Nth frame, the scanning beam power is gated on over the entire frame except for the normal horizontal and vertical blanking intervals, and the video output signal corresponding to the image field can be taken for the entire image made up of bright objects and enhanced dim objects. Frame counter 28 is reset after the Nth frame.

To prevent distorted images from appearing on the display monitor 26 receiving the video signal from the signal camera 8, coincidence gate 24 is provided. This gate is disabled during all frames subsequent to the Nth frame, to block the video signal from entering the display monitor. During the Nth frame, gate 24 is enabled whereby the video signal can be applied to the display monitor 26. If desired, the video signal can be transmitted to a remote location by being applied to a conventional transmitter 30 where it is modulated in a known manner and applied to antenna 32 for transmission to the remote location.

While the invention has been particularly shown and described with reference to a preferred embodiment thereof, it will be understood by those skilled in the art that various changes in form and details may be made therein without departing from the spirit and scope of the invention.

What is claimed is:

1. A dim object enhancement system for use with a video signal producing system including a television signal camera of the type having a signal plate having induced thereon a pattern of varying conductivity or charge corresponding to image brightness, and means for periodically scanning said signal plate with an electron beam to neutralize the charge on said signal plate and produce an electrical video signal having an amplitude varying in proportion to the charge on said signal plate, one complete scan of said signal plate constituting a frame, said enhancement system comprising:

a. a television control camera of the same type as said television signal camera and positioned to receive the same optical image received by said television signal camera;

b. analog threshold means connected to receive the electrical video signal from said television control camera for generating a threshold signal when said electrical video signal from said television control camera exceeds a predetermined threshold level;

c. gate means responsive to said threshold signal for blanking said electron beam in said television signal camera in the absence of said threshold signal; and d. frame counter means synchronized with said means for periodically scanning and connected to said gate means for inhibiting the blanking of said electron beam by the presence of said threshold signal periodically after a predetermined number of frames.

2. The enhancement system of claim 1 further comprising:

a. second gate means connected to receive said electrical video signal from said television signal camera and responsive to said frame counter means for passing said electrical video signal periodically after said predetermined number of frames and inhibiting said electrical signal at all other times; and b. output means connected to said second gate means for receiving said electrical video signal when passed by said second gate means.

3. The enhancement system of claim 2 further comprising:

a. a telescope for focusing a star field onto said television signal camera; and b. a beam splitter interposed between said telescope and said television signal camera for focusing said star field onto said television control camera.

4. The enhancement system of claim 3 wherein said output means includes a display monitor for receiving said electrical video signal from said second gate means for producing a visual image of the star field focused on said television signal camera.

5. The enhancement system of claim 3 wherein said output means includes means for transmitting said electrical video signal from said second gate means to a remote station.

* * * * *